United States Patent
Arky (10) Patent No.: US 10,686,855 B2
(45) Date of Patent: Jun. 16, 2020

(54) HLS OVER MULTIMEDIA BROADCAST MULTICAST SERVICE (MBMS)

(71) Applicant: Verizon Patent and Licensing Inc., Arlington, VA (US)

(72) Inventor: John J. Arky, Los Angeles, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 310 days.

(21) Appl. No.: 15/272,529

(22) Filed: Sep. 22, 2016

(65) Prior Publication Data

US 2018/0084018 A1   Mar. 22, 2018

(51) Int. Cl.
*H04L 29/06* (2006.01)
*H04W 4/06* (2009.01)
*H04L 29/08* (2006.01)

(52) U.S. Cl.
CPC ...... *H04L 65/4076* (2013.01); *H04L 65/4084* (2013.01); *H04L 65/602* (2013.01); *H04L 65/608* (2013.01); *H04L 67/02* (2013.01); *H04W 4/06* (2013.01)

(58) Field of Classification Search
CPC ..... H04L 65/4076; H04L 65/608; H04W 4/06
USPC .......................................................... 709/219
See application file for complete search history.

(56) References Cited

U.S. PATENT DOCUMENTS

| | | | |
|---|---|---|---|
| 9,160,779 B2* | 10/2015 | Cherian | H04L 65/605 |
| 9,712,585 B2* | 7/2017 | Lohmar | H04L 65/4076 |
| 10,015,235 B2* | 7/2018 | Bertz | H04L 67/2814 |
| 2014/0372624 A1* | 12/2014 | Wang | H04L 65/60 709/231 |
| 2015/0049661 A1* | 2/2015 | Draznin | H04W 4/00 370/312 |
| 2016/0294900 A1* | 10/2016 | Agrawal | H04L 65/4076 |
| 2018/0206079 A1* | 7/2018 | Zhu | H04W 4/06 |

* cited by examiner

*Primary Examiner* — Kevin T Bates
*Assistant Examiner* — Nazia Naoreen (57) ABSTRACT

A Multimedia Broadcast Multicast Services (MBMS) publishing device receives a location of a Hypertext Transfer Protocol (HTTP) Live Streaming (HLS) master playlist for content, to be multicast, that is stored in a content delivery network (CDN), and pulls, using the location, the HLS master playlist from the CDN. The MBMS publishing device pulls, based on the HLS master playlist, HLS segment files from the CDN, and pushes the HLS segment files to a MBMS broadcast multicast service center (BM-SC) for broadcast via multicast bearer in a MBMS synchronization area of a wireless network.

20 Claims, 8 Drawing Sheets

HLS OVER MULTIMEDIA BROADCAST MULTICAST SERVICE (MBMS)

BACKGROUND

Multimedia Broadcast Multicast Services (MBMS) consists of a specification directed towards providing the delivery of broadcast and multicast services within cellular networks, such as Third Generation Partnership Project (3GPP) or Long Term Evolution (LTE) cellular networks. The multicast services of MBMS transmit mobile TV and radio broadcasts, live streaming video services, and file deliveries. When transmissions are delivered through an LTE network, the specification is referred to as Evolved MBMS (eMBMS) or LTE broadcast.

DETAILED DESCRIPTION OF THE PREFERRED EMBODIMENTS

The following detailed description refers to the accompanying drawings. The same reference numbers in different drawings may identify the same or similar elements. The following detailed description does not limit the invention, which is defined by the claims.

Hypertext Transfer Protocol Live Streaming (HLS) is a HTTP-based media streaming communications protocol that involves breaking the media stream into a sequence of file downloads. Each file may be downloaded as one portion of a transport stream. Each downloaded file may be played in sequence to present a continuous media stream. In HLS, a given multimedia presentation is specified by a Uniform Resource Identifier (URI) to the playlist file, which itself consists of an ordered list of media URIs and informational tags. Each media URI refers to a media file that is a segment of a single continuous media stream. To play a stream, a client first obtains the playlist file and then obtains and plays each media file in the playlist in sequence.

Exemplary embodiments described herein implement HLS within a wireless network, using MBMS, so as to enable HLS content sessions to be multicast within the wireless network to numerous endpoint User Equipments (UEs). As described herein, a MBMS HLS multicast publishing device pulls HLS content, designated for multicast broadcasting, from the content delivery network, and pushes the HLS content to a broadcast multicast service center in the wireless network. The broadcast multicast service center multicasts the content, via at least one gateway in the wireless network, to one or more MBMS synchronization areas comprising multiple eNodeBs having hardware that communicates directly with UEs. The multiple eNodeBs transmit the multicast HLS content to UEs, within the eNodeB's transmission area, that join the content session.

Figure 1:
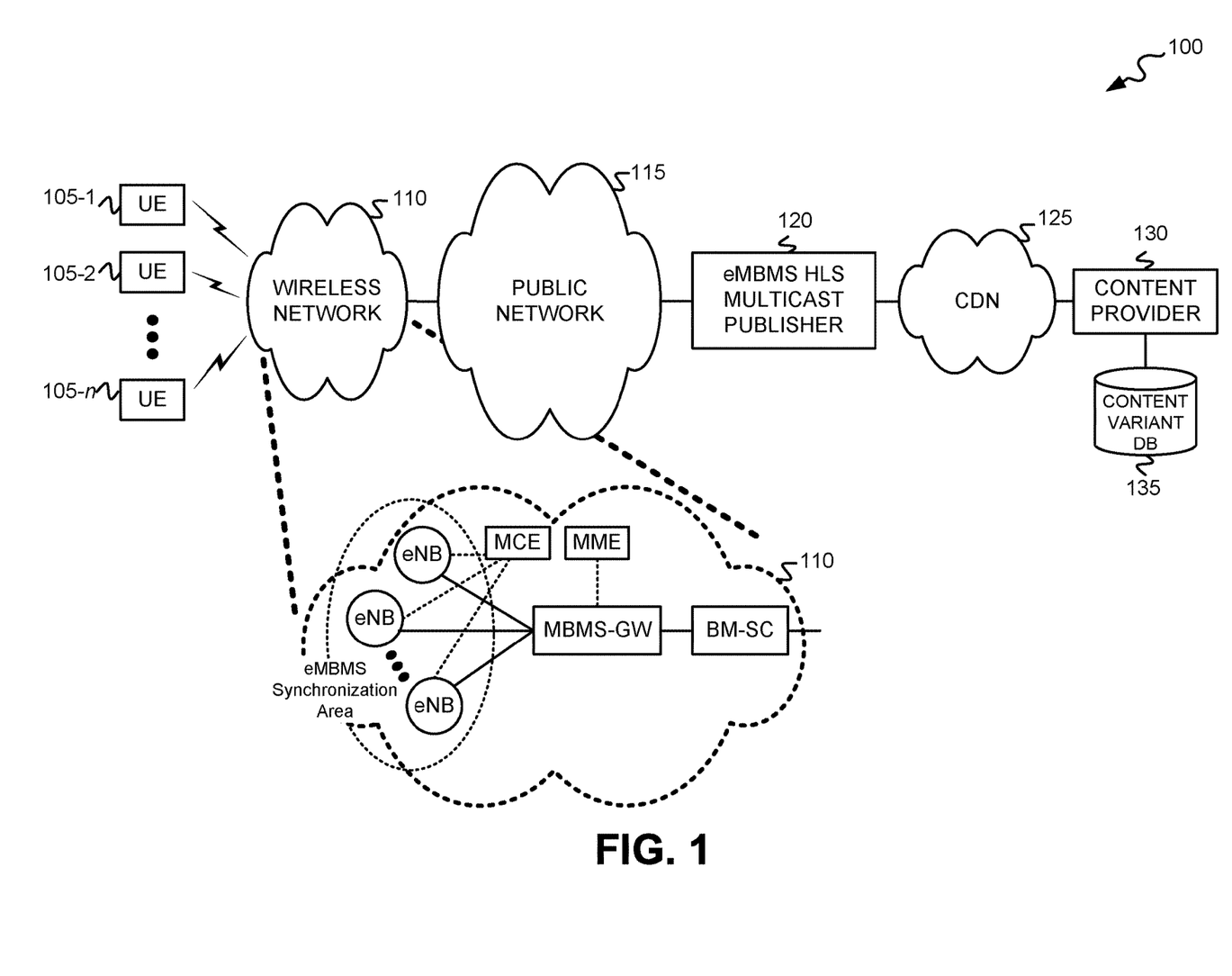
FIG. 1 illustrates an exemplary network environment in which Hypertext Transfer Protocol (HTTP) Live Streaming (HLS) multicast sessions are implemented in a wireless network using MBMS.

FIG. 1 illustrates an exemplary network environment 100 in which HLS multicast sessions are implemented in a wireless network using MBMS. Network environment 100 may include multiple user equipments (UEs) 105-1 through 105-n, a wireless network 110, a public network 115, an eMBMS HLS multicast publisher 120, a content delivery network (CDN) 125, a content provider 130, and a content variant DB 135.

UEs 105-1 through 105-n (generically referred to as "UEs 105" or "UE 105") may each include an electronic device that further includes at least one communication interface for communicating via a wireless network(s), such as wireless network 110. UEs 105 may each include, for example, a cellular radiotelephone (e.g., a smart phone); a personal digital assistant (PDA); a wearable computer; a desktop, laptop, palmtop or tablet computer; or a media player. UEs 105 may, however, include any type of electronic device that includes a communication interface for communicating via wireless network 110. A "user" or "subscriber" (not shown in FIG. 1) may be associated with each UE 105, where the user or subscriber may be an owner, operator, and/or a permanent or temporary user of UE 105.

Wireless network 110 may include one or more wireless networks including, for example, one or more public land mobile networks (PLMNs), and/or one or more satellite mobile networks. The PLMN(s) may include, for example, a Code Division Multiple Access (CDMA) 2000 PLMN, a Global System for Mobile Communications (GSM) PLMN, a Long Term Evolution (LTE) PLMN and/or other types of PLMNs (e.g., such as a fifth-generation or 5G network).

Public network 115 may include one or more networks of various types including, for example, a telecommunications network (e.g., Public Switched Telephone Networks (PSTNs)), the Internet, a wired and/or wireless local area network (LAN), a wired and/or wireless wide area network (WAN), a metropolitan area network (MAN), an intranet, or a cable network (e.g., an optical cable network).

eMBMS HLS multicast publisher 120 includes one or more network devices that initiate a HLS multicast content session using MBMS in wireless network 110, pulling HLS content from CDN 125, and pushing the HLS content to wireless network 110 for multicasting.

CDN 125 includes an interconnected system of network devices capable of delivering digital content (e.g., digital video) to numerous end points via public network 115. Content provider 130 includes one or more network devices that manage and store digital content for delivery via CDN 125. Content variant DB 135 may include a data structure that identifies different variants associated with each item of digital content managed and/or stored by content provider 130. The different variants may include, for example, different video resolutions of video content for UEs 105 having different types and sizes of displays and/or different bit rates.

The configuration of the components of network environment 100 depicted in FIG. 1 is for illustrative purposes only, and other configurations may be implemented. Therefore, network environment 100 may include additional, fewer and/or different components, that may be configured differently, than depicted in FIG. 1. For example, though a single content provider 130 and a single CDN 125 are depicted in FIG. 1, there may be multiple, different content providers 130 and CDNs 125, and eMBMS multicast publisher 120 may pull content from any and/or all of the content providers 130 and/or CDNs 125.

Figure 2:
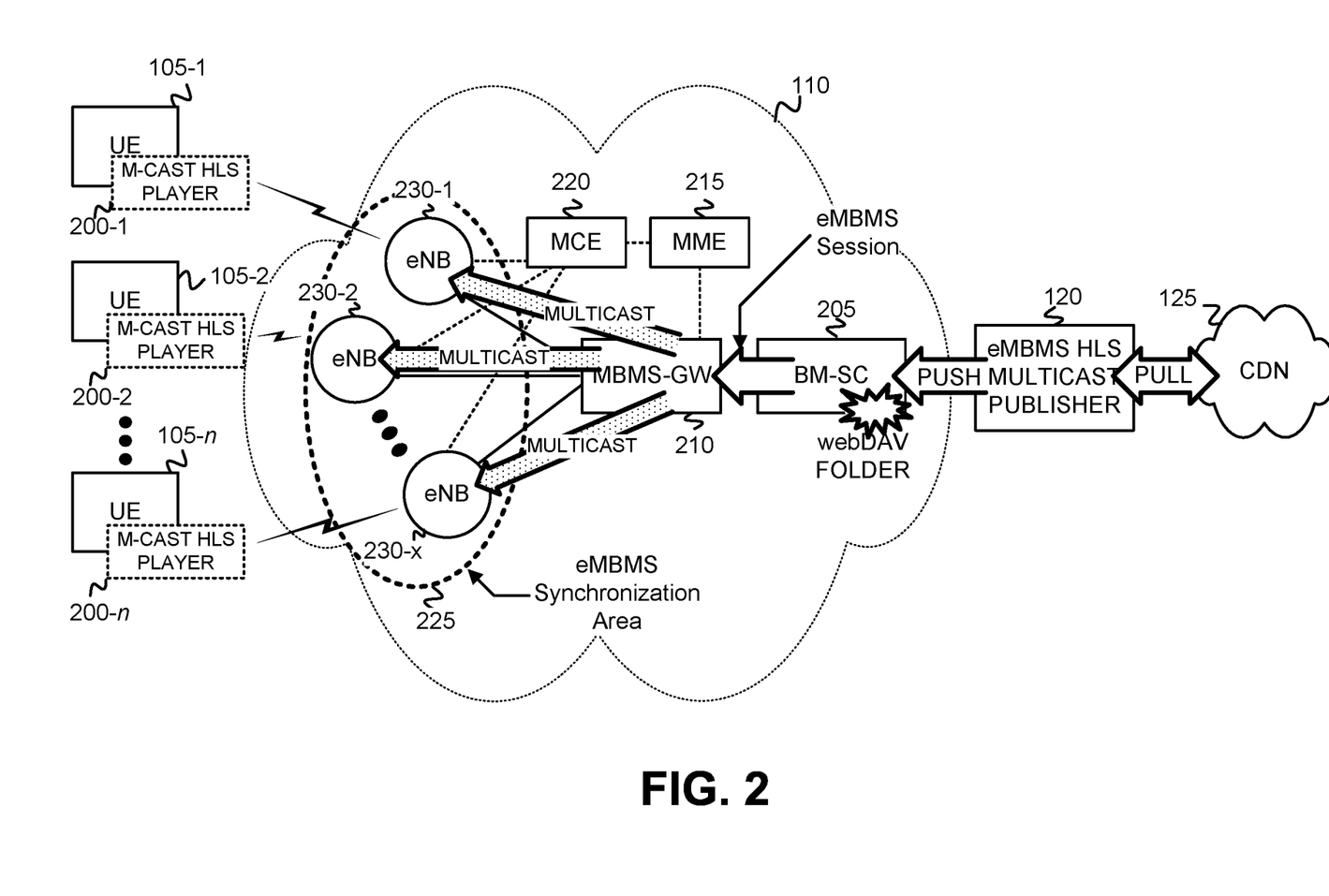
FIG. 2 illustrates an exemplary overview of the multicast delivery of HLS content using MBMS via the wireless network of FIG. 1.

FIG. 2 illustrates an exemplary overview of the multicast delivery of HLS content using MBMS via the wireless network 110 of FIG. 1. As shown, wireless network 110 may include a broadcast multicast service center (BM-SC) 205, a MBMS gateway (MBMS-GW) 210, a mobility management entity (MME) 215, a MBMS coordination entity (MCE) 220, and an eMBMS synchronization area(s) 225 that includes multiple eNodeBs (eNBs) 230-1 through 230-$x$ (generically referred to as "eNB 230" or "eNBs 230"). As further shown in FIG. 2, UEs 105-1 through 105-$n$ may connect to various different eNBs 230 of eMBMS synchronization area(s) 225. eMBMS synchronization area 225 includes a group of eNBs 230 that are synchronized to transmit multicast data in a same multicast channel (MCH). The eNBs 230 in the synchronization area 225 transmit the same broadcast signals in a synchronized manner for better signal reception at a UE 105. eNodeBs 230 each include hardware that communicates directly with wireless devices (e.g., UEs 105) to enable network service with wireless network 110 (e.g., a PLMN). Each of eNBs 230 includes a wireless transceiver for communicating with the wireless devices (e.g. UEs 105), and a wired or wireless connection to other nodes of wireless network 110, such as a wired or wireless connection to MBMS-GW 210 and/or MCE 220.

BM-SC 205 includes one or more network devices that engage in authentication, content authorization, and billing; act as a proxy content server; and configure data flow through wireless network 110. MBMS-GW 210 includes one or more network devices that deliver MBMS packets to each eNB 230 transmitting the MBMS service. MBMS-GW 210 uses Internet Protocol (IP) multicast to deliver the downlink packets to eNBs 230.

MME 215 includes one or more network devices that perform, within wireless network 110, mobility management functions, call control management functions, session management functions, and/or identity management functions associated with providing network service to UEs 105.

MCE 220 includes one or more network devices that are responsible for allocating time and frequency resources within wireless network 110. MCE 220 acts as an MBMS scheduler that allocates radio resources, performs session admission control, and manages MBMS services.

As further depicted in FIG. 2, HLS content multicasting, using MBMS, may include eMBMS HLS multicast publisher 120 pulling, from CDN 125, a master playlist file and associated HLS segment files of content, and pushing the HLS segment files of the content to a temporary folder at BM-SC 205 in wireless network 110. During an eMBMS content session, BM-SC 205 retrieves the HLS segment files from the temporary folder and sends the HLS segment files to MBMS-GW 210. BM-SC 205 may, for example, use the File Delivery over Unidirectional Transport (FLUTE) protocol over User Datagram Protocol (UDP) to send the HLS segment files to MBMS-GW 210.

Upon receipt, MBMS-GW 210 broadcasts the HLS segment files, over a multicast bearer, to each eNB 230 in eMBMS synchronization area(s) 225. Each UE 105 connected to eMBMS synchronization area 225 may join the HLS content session using a service ID associated with the content of the broadcasted HLS segment files. Upon joining the HLS content session, each UE 105 receives and stores the HLS segment files broadcasted over the multicast bearer.

Multicast HLS players 200-1 through 200-$n$ (generically referred to as "multicast HLS players 200" or "multicast HLS player 200") may reside at respective ones of UEs 105-1 through 105-$n$. Multicast HLS player 200 may present, or playback, multicast content broadcasted by MBMS-GW 210 within the eMBMS synchronization area 225. For example, subsequent to UE 105 joining the HLS content session, multicast HLS player 200 obtains a variant playlist file for the HLS content session, retrieves the locally stored HLS segment files, and plays the HLS segment files in a sequence identified by the obtained variant playlist file.

Though a single eMBMS synchronization area 225, a single MBMS-GW 210, and a single BM-SC 205 are depicted in FIG. 2, wireless network 110 may include multiple different eMBMS synchronization areas 225, multiple MBMS-GW 210 and multiple BM-SC 205. For example, during a national broadcast of multicast HLS content, the HLS content may be pushed to multiple different BM-SC 205$s$ for multicast broadcasting to the multiple different eMBMS synchronization areas 225. Therefore, the configuration of the components of network environment 100 depicted in FIG. 2 is for illustrative purposes, and other configurations may implemented. Therefore, network environment 100 may include additional, fewer and/or different components, that may be configured differently, than depicted in FIG. 2.

Figure 3:
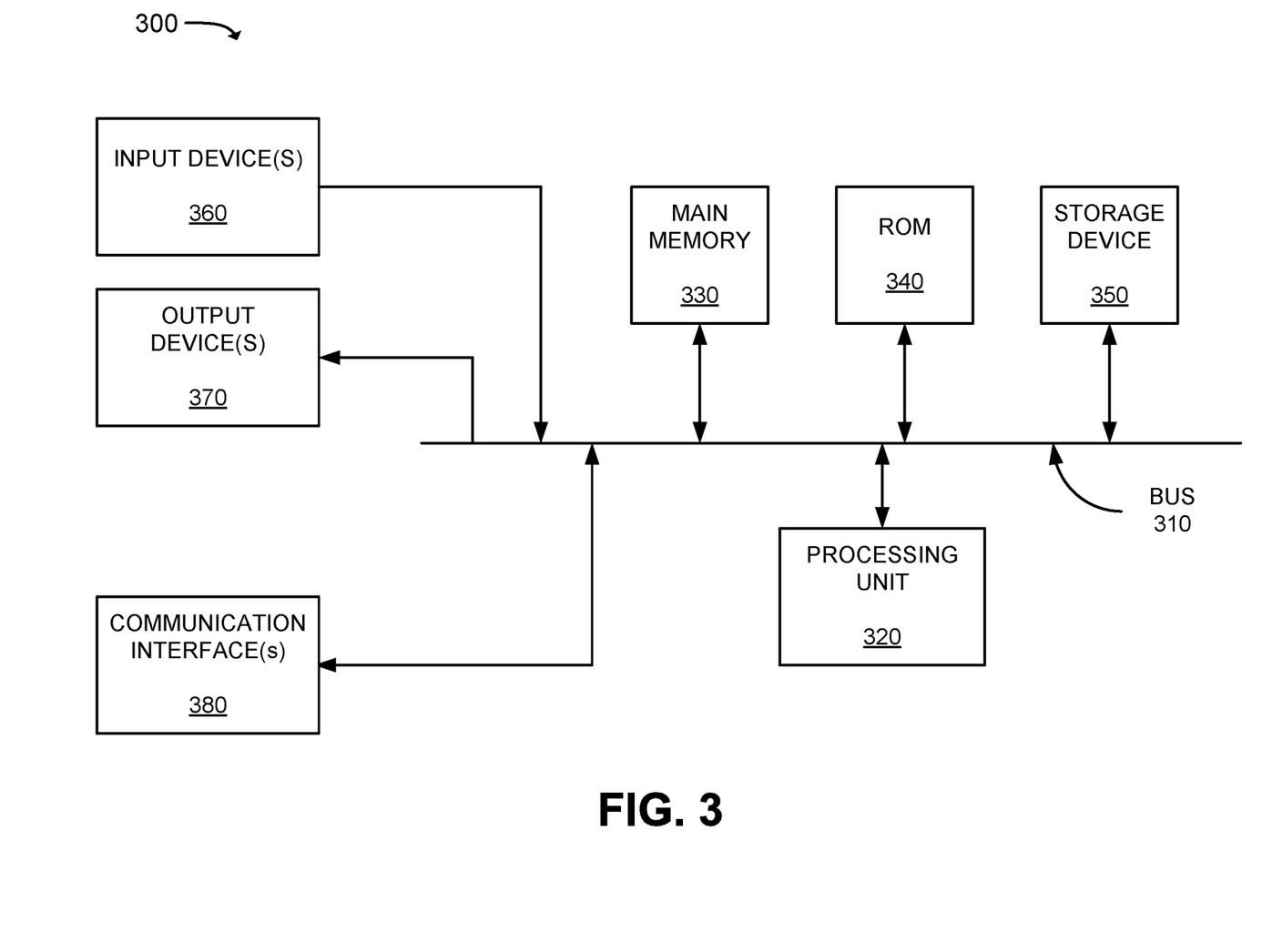
FIG. 3 is a diagram that depicts exemplary components of a device, that may correspond to the User Equipments, multicast publisher, gateway and/or service center of FIGS. 1 and 2.

FIG. 3 is a diagram that depicts exemplary components of a device 300. UEs 105, eMBMS HLS multicast publisher 120, MBMS-GW 210 and BM-SC 205 may each include a device similar to device 300, possibly with some variations in components and/or configuration. Device 300 may include a bus 310, a processing unit 320, a main memory 330, a read only memory (ROM) 340, a storage device 350, an input device(s) 360, an output device(s) 370, and a communication interface(s) 380.

Bus 310 includes a path that permits communication among the components of device 300. Processing unit 320 may include one or more processors or microprocessors, or processing logic (e.g., circuitry), which may interpret and execute instructions. Main memory 330 may include a random access memory (RAM) or another type of dynamic storage device that may store information and instructions for execution by processing unit 320. ROM 340 may include a ROM device or another type of static storage device that stores static information and instructions for use by processing unit 320. Storage device 350 may include a magnetic, flash memory, and/or optical recording medium. Main memory 330, ROM 340 and storage device 350 may each be a "tangible and/or non-transitory computer-readable medium."

Input device 360 may include one or more mechanisms that permit an operator to input information to device 300, such as, for example, a keypad or a keyboard, a display with a touch sensitive panel, voice recognition and/or biometric mechanisms, etc. Output device 370 may include one or more mechanisms that output information to the operator or user, including a display (e.g., with a touch sensitive panel), a speaker, etc. Input device 360 and output device 370 may be implemented as a graphical user interface (GUI) (e.g., a touch screen GUI that uses any type of touch screen device) that displays GUI information and which receives user input via the GUI. Communication interface(s) 380 may include a transceiver (e.g., a transmitter and/or receiver) that enables device 300 to communicate with other devices and/or systems. For example, communication interface(s) 380 may include wired and/or wireless transceivers for communicating via wireless network 110, public network 115 and/or CDN 125. In the case of device 300 being a UE 105, communication interface(s) 380 may include a wireless transceiver(s), such as, for example, a transceiver for communicating with an eNB 225 of wireless network 110.

The configuration of components of device 300 shown in FIG. 3 is for illustrative purposes. Other configurations may be implemented. Therefore, device 300 may include additional, fewer and/or different components, arranged in a different configuration, than depicted in FIG. 3. For example, eMBMS HLS multicast publisher 120, MBMS-GW 210 and/or BM-SC 205 may include similar components to those shown in FIG. 3, but may omit input device(s) 360, and/or output device(s) 370 (e.g., such as a keyboard or a display monitor).

As discussed above, exemplary embodiments implement HLS within a wireless network (e.g., within network environment 100), using MBMS, so as to enable HLS content sessions to be multicast within the wireless network 110 to numerous endpoint User Equipments (UEs) 105. As described herein, a MBMS HLS multicast publishing device 120 pulls HLS content, designated for multicast broadcasting, from the CDN 125, and pushes the HLS content to a BM-SC 205 in wireless network 110. The BM-SC 205 multicasts the content, via at least one MBMS-GW 210, to one or more MBMS synchronization areas 225 comprising possibly multiple eNBs 230 to communicate directly with UEs 105. The multiple eNBs 230 transmit the multicast HLS content to UEs 105, within the eNB's 230 transmission area, that join the content session.

Figure 4A:
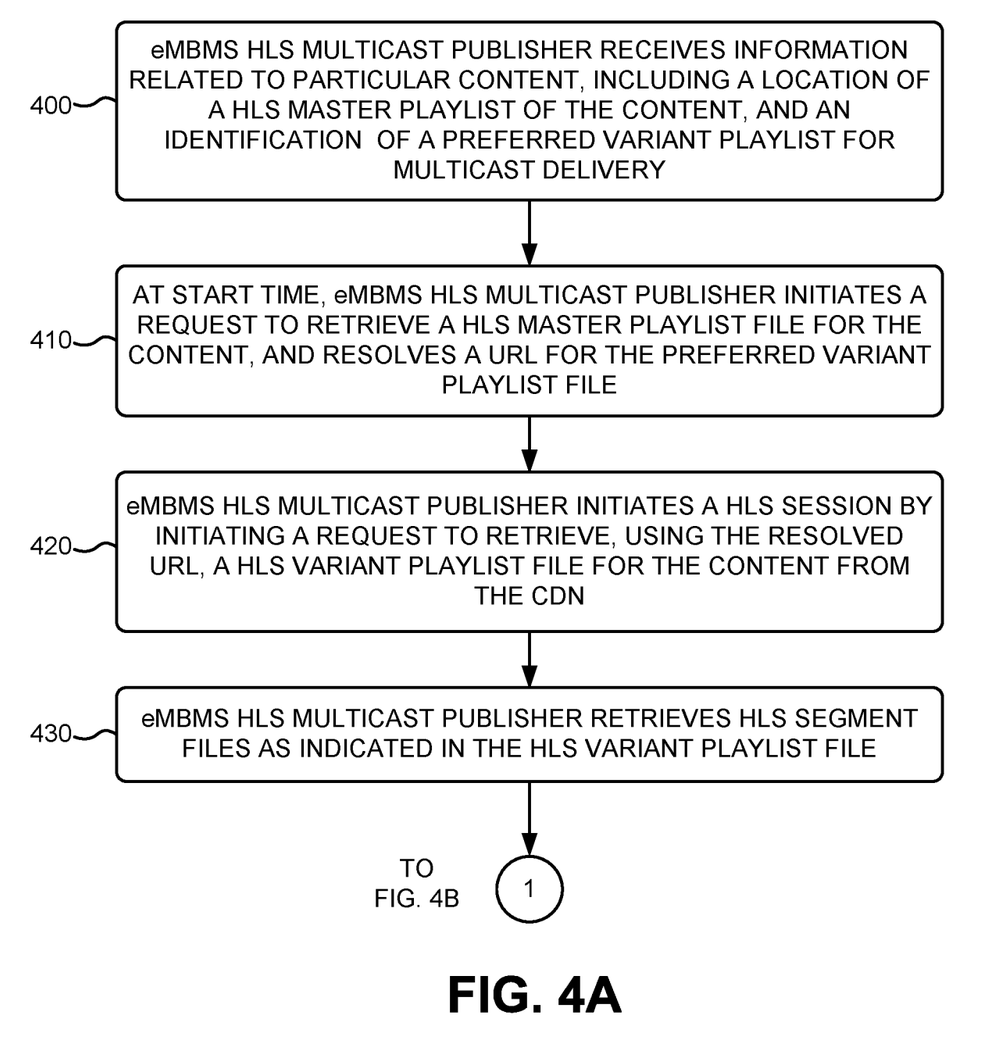
FIGS. 4A and 4B are flowcharts that illustrate an exemplary process for broadcasting HLS segment files, for a HLS content session, via a multicast bearer over MBMS.
Figure 4B:
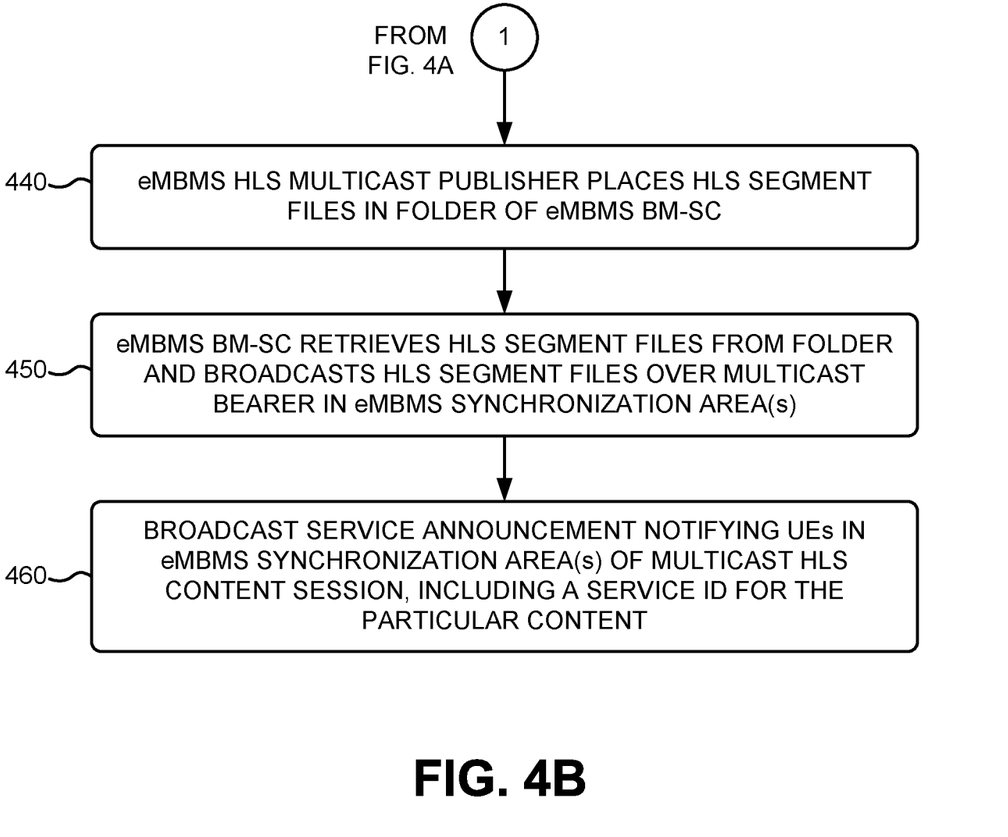

FIGS. 4A and 4B are flowcharts that illustrate an exemplary process for broadcasting HLS segment files, for a HLS content session, via a multicast bearer over MBMS. The process of FIG. 6 (discussed below) addresses a content session by a UE 105 for content playback. The exemplary process of FIGS. 4A and 4B may be implemented by eMBMS HLS multicast publisher 120, in conjunction with eMBMS BM-SC 205, and possibly other network nodes. The exemplary process of FIGS. 4A and 4B is described below with reference to the exemplary messaging diagram of FIG. 5.

The exemplary process includes eMBMS HLS multicast publisher 120 receiving information related to particular content, including, for example, a location of a HLS master playlist of the content, and an identification of a preferred variant playlist for multicast delivery (block 400). The HLS master playlist includes a list of URLs associated with each of multiple different variant playlists, where the URLs enable retrieval of a respective variant playlist from CDN 125. Each of the multiple different variant playlists may be directed to a respective media stream having, for example, a different video resolution (e.g., for UEs 105 having different types and/or sizes of displays). Each of the variant playlists includes an ordered list of Uniform Resource Identifiers (URIs), where each URI refers to a media file that is a segment of a single continuous media stream. The information related to the particular content received by eMBMS HLS multicast publisher 120 may additionally include a start time and a stop time. The start time may be a time (e.g., coordinated universal time (UTC)) at which the particular content is available for broadcasting over wireless network 110 (e.g., a live broadcast begins). The stop time may be a time at which the particular content is no longer available for broadcasting over wireless network 110 (e.g., the live broadcast has finished).

Figure 5:
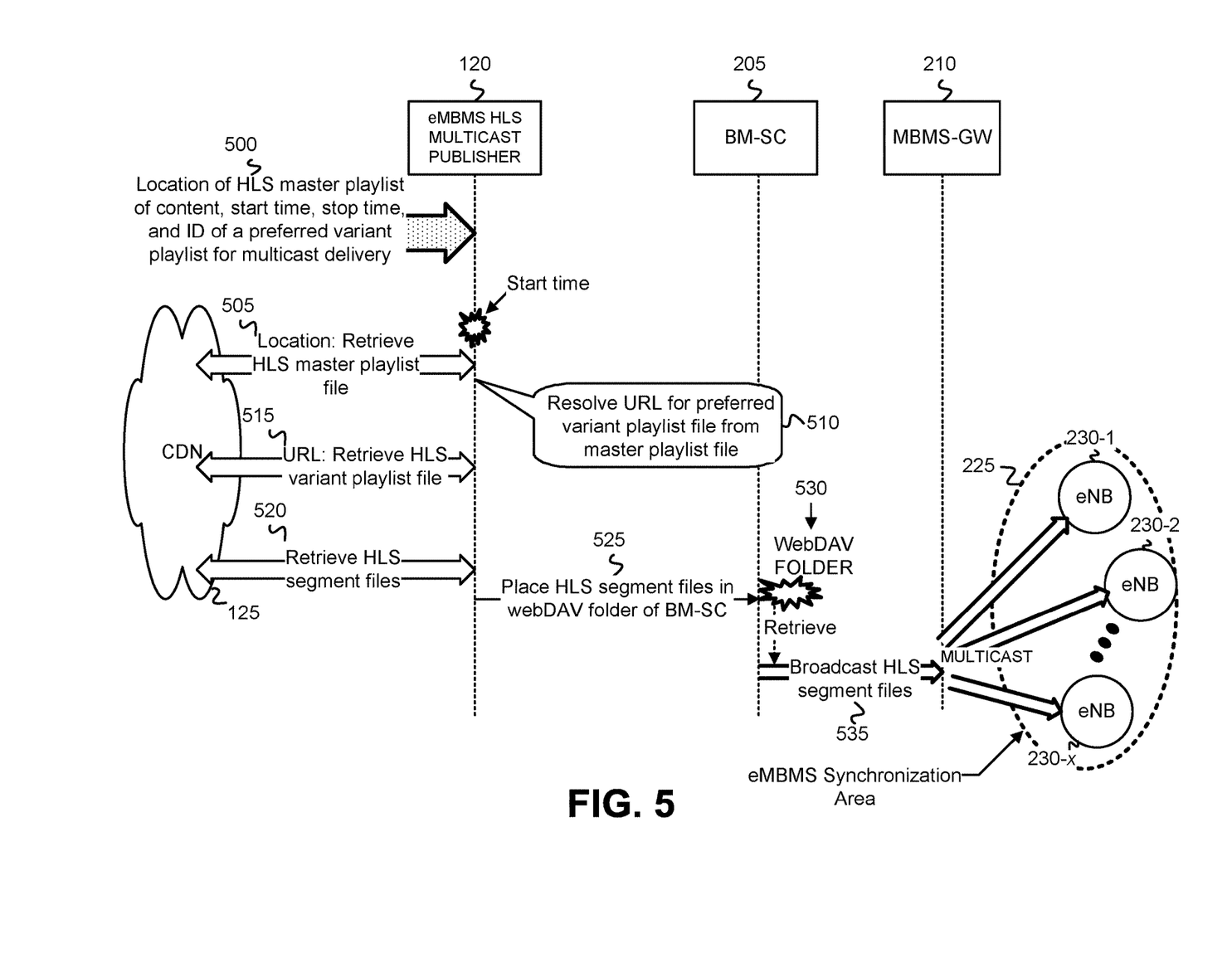
FIG. 5 is an exemplary messaging diagram associated with the exemplary process of FIGS. 4A and 4B.

Content provider 130 (e.g., an operator or an administrator) may supply the information related to the particular content in advance of the content being multicast via wireless network 110. The location of the HLS master playlist may include, for example, a Uniform Resource Locator (URL) of the HLS master playlist stored in CDN 125. The identification of the preferred variant playlist may include a unique identifier that may used to retrieve a URL of the preferred variant playlist from the HLS master playlist. The embodiment of FIG. 5 depicts eMBMS HLS multicast publisher 120 receiving 500 a location of the HLS master playlist of the content, the start time, the stop time, and the ID of the preferred variant playlist for multicast delivery.

At the start time, eMBMS HLS multicast publisher 120 initiates a request to retrieve a HLS master playlist file for the content, and resolves a Uniform Resource Locator (URL) for the preferred variant playlist file (block 410). eMBMS HLS multicast publisher 120 may initiate, for example, a HTTP GET request to retrieve the HLS master playlist file from the location in CDN 125 provided in block 400. Upon receipt of the HLS master playlist file, eMBMS HLS multicast publisher 120 matches the preferred variant playlist ID, identified in block 400, with a variant playlist ID included among multiple variant playlist IDs listed in the HLS master playlist file. eMBMS HLS multicast publisher 120 retrieves the URL, associated with the matched variant playlist ID, in the HLS master playlist file. The retrieved URL represents a location of the preferred variant playlist file in CDN 125. FIG. 5 depicts the occurrence of a "start time," and the retrieval 505 of the HLS master playlist file from the location in CDN 125 at the "start time." FIG. 5 further depicts eMBMS HLS multicast publisher 120 resolving 510 the URL for the preferred variant playlist file from the retrieved master playlist file.

eMBMS HLS multicast publisher 120 initiates a HLS session by initiating a request to retrieve, using the resolved URL, a HLS variant playlist file for the content from the CDN (block 420). eMBMS HLS multicast publisher 120 may initiate, for example, a HTTP GET request to retrieve the HLS variant playlist file from CDN 125 based on the resolved URL. FIG. 5 depicts eMBMS HLS multicast publisher 120 retrieving 515 the HLS variant playlist file from CDN 125 using the resolved URL. In an embodiment in which the content includes Video On Demand (VOD) content, eMBMS HLS multicast publisher 120 may, only a single time, request to retrieve the HLS variant playlist file for the content. In this embodiment, the HLS variant playlist file may include a complete identification and list of the URIs of the sequence of HLS segment files for the entirety of the content. In another embodiment in which the content includes live content (i.e., occurring and being broadcast at that current time), the HLS variant playlist file may need to be updated, during the live broadcast, to include URIs of new HLS segment files as they are generated during the live broadcast. Therefore, in this embodiment, eMBMS HLS multicast publisher 120 may periodically (e.g., at a specific interval) send a HTTP GET request to retrieve the updated HLS variant playlist file from CDN 125. The updated HLS variant playlist file retrieved from CDN 125 may include an identification and list of the URIs of the sequence of HLS segment files for some period prior to the current time (e.g., allowing a certain amount of "re-winding" among a set of HLS segments prior to live), and may include an identification and list of the URIs of the HLS segment files up through the current time. The updated HLS variant playlist file, thus, is continuously, in CDN 125, being updated with new HLS segment files that include content up through a current time such that the updated HLS variant playlist file includes an updated URI sequence for the live content.

eMBMS HLS multicast publisher 120 retrieves (e.g., pulls) HLS segment files as indicated in the HLS variant playlist file (block 430). eMBMS HLS multicast publisher 120 retrieves URIs for the HLS segment files from the HLS variant playlist file, and uses the URIs to retrieve (e.g., pull) the HLS segment files. In the case of live content, eMBMS HLS multicast publisher 120 may use newly added URIs from an updated HLS variant playlist file (as described above with respect to block 420) to pull corresponding HLS segment files from CDN 125. FIG. 5 depicts eMBMS HLS multicast publisher 120 retrieving 520 the HLS segment files from CDN 125.

eMBMS HLS multicast publisher 120 places (e.g., pushes, transmits, or sends) the HLS segment files in a folder of eMBMS BM-SC 205 (block 440). eMBMS HLS multicast publisher 120 may, for example, perform an HTTP PUT command to temporarily place the HLS segment files in a Web Distributed Authoring and Versioning (webDAV) folder of eMBMS BM-SC 205. FIG. 5 depicts eMBMS HLS multicast publisher 120 temporarily placing 525 the HLS segment files in the webDAV folder 530 of eMBMS BM-SC 205.

eMBMS BM-SC 205 retrieves the HLS segment files from the folder and broadcasts the HLS segment files over a multicast bearer in an eMBMS synchronization area(s) 225 (block 450). FIG. 5 depicts eMBMS BM-SC 205 retrieving the HLS segment files from webDAV folder 530, and broadcasting 535 the HLS segment files over the multicast bearer in eMBMS synchronization area 225. The multicasted HLS segment files are received, in eMBMS synchronization area 225, at eNBs 230-1 through 230-x, and further broadcast by eNBs 230-1 through 230-x to UEs 105 requesting the HLS content session.

A service announcement may be broadcast to notify UEs 105 in the eMBMS synchronization area(s) 225 of the multicast HLS content session, including a service ID for the particular content (block 460). eMBMS HLS multicast publisher 120, BM-SC, MBMS-GW 210 or a different network node (not shown in FIG. 1, 2, or 5) may originate the service announcement. In one implementation, the service announcement may be originate, for broadcast, from a provisioning system (not shown), such as a Broadcast Video Provisioning System (BVPS). In this implementation, Representational State Transfer (REST) Application Programming Interfaces (APIs) may be used for communications between the BVPS and eMBMS HLS multicast publisher 120 to enable the scheduling and provisioning of content delivery over eMBMS.

The exemplary process of FIGS. 4A and 4B may be repeated for each HLS multicast content session to be made available for broadcasting within wireless network 110. As noted above, multiple eNBs 230 may transmit the multicast HLS content to UEs 105 within their transmission area that join a particular multicast content session.

Figure 6:
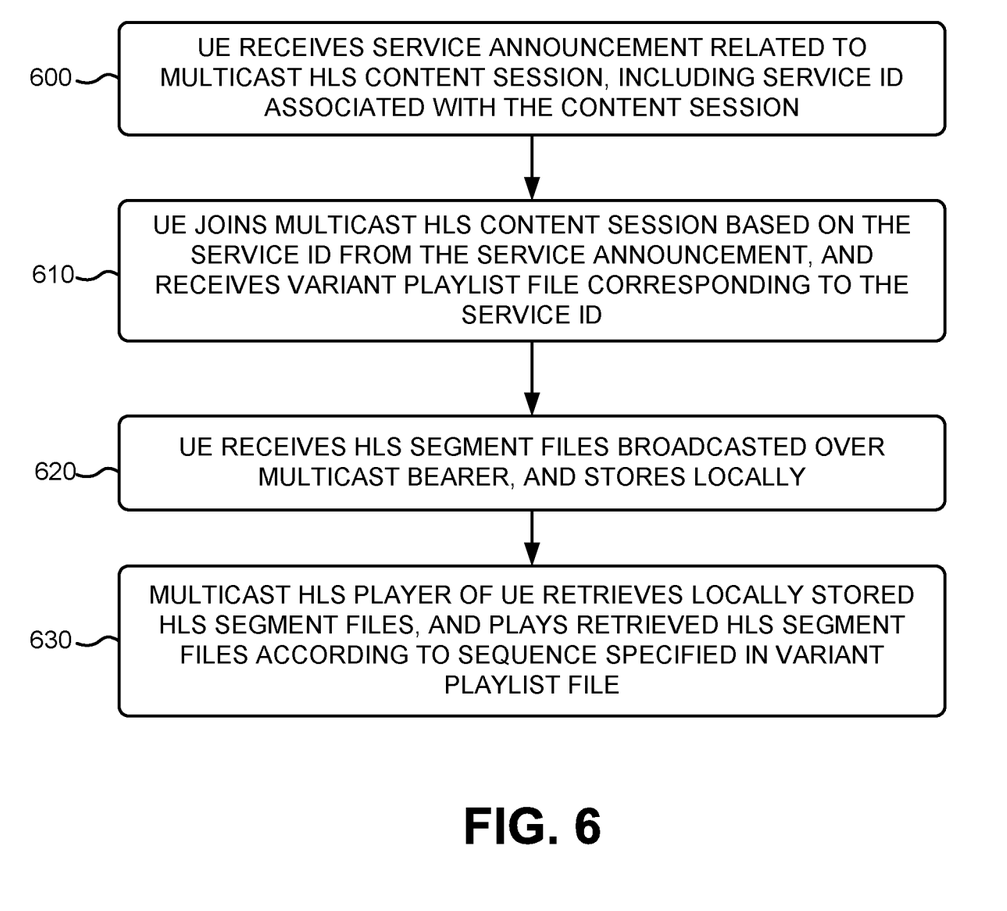
FIG. 6 is a flowchart that illustrates an exemplary process for User Equipment playback of HLS segment files received via MBMS.

FIG. 6 is a flowchart that illustrates an exemplary process for joining a multicast content session and for UE playback of HLS segment files received via MBMS. In one embodiment, the exemplary process of FIG. 6 may be implemented by a UE 105. The exemplary process of FIG. 6 is described below with reference to the exemplary messaging diagram of FIG. 7.

Figure 7:
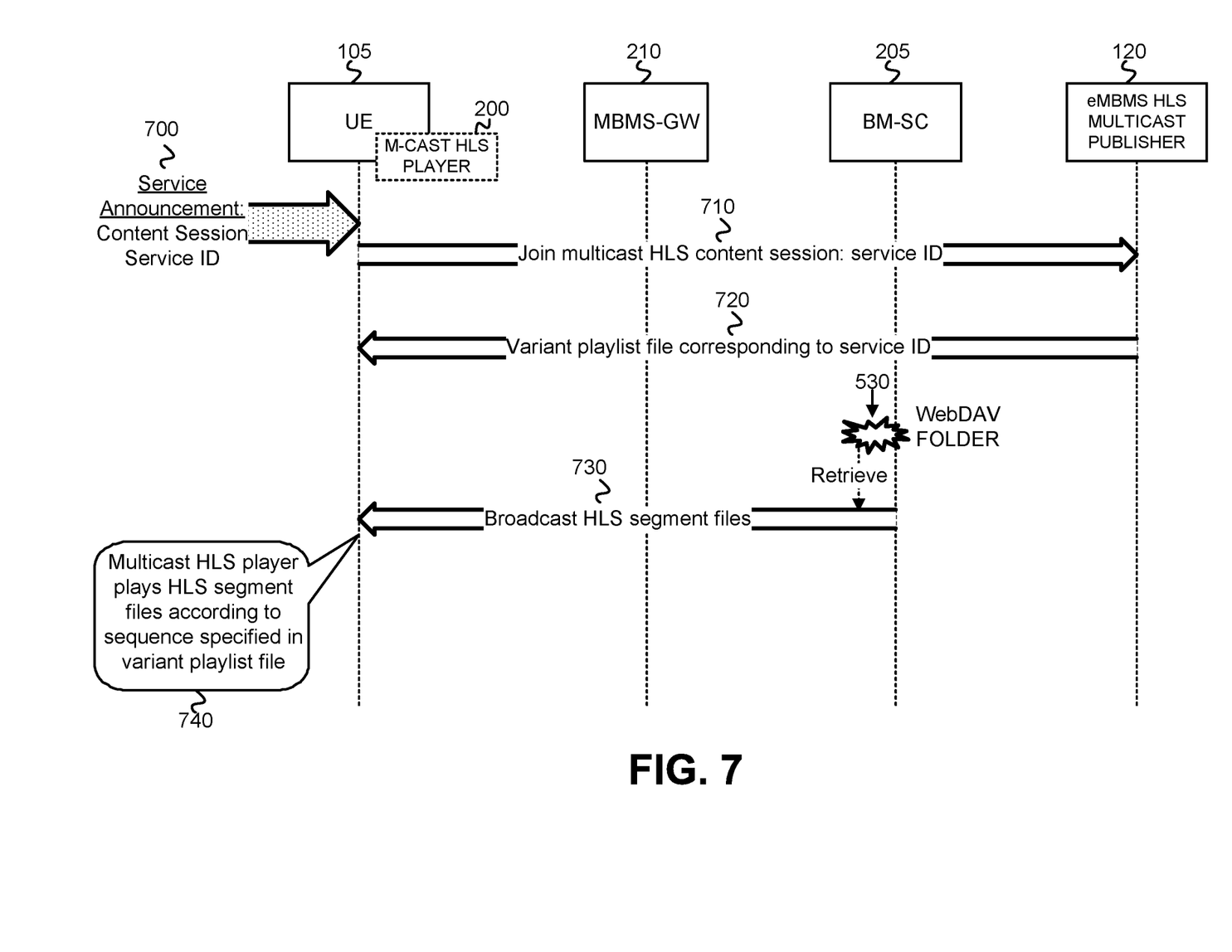
FIG. 7 is an exemplary messaging diagram associated with the exemplary process of FIG. 6.

UE 105 receives a service announcement related to a multicast HLS content session, including a service ID associated with the content session (block 600). FIG. 7 depicts UE 105 receiving a broadcasted service announcement 700 that includes a session ID for a content session. Multicast HLS player 200 of UE 105 joins the multicast HLS content session based on the service ID of the service announcement, and receives a variant playlist file corresponding to the service ID (block 610). Multicast HLS player 200 of UE 105 may send a join request, which includes the service ID, to eMBMS HLS multicast publisher 120 to join the multicast HLS content session. For example, a user of UE 105 may request to view content. Upon receipt of the join request, eMBMS HLS multicast publisher 120 extracts the service ID from the join request, retrieves the stored variant playlist file corresponding to the service ID, and returns the variant playlist file to UE 105 via BM-SC 205 and MBMS-GW 210. In this implementation, multicast HLS player 200 of UE 105, thus, retrieves the variant playlist file over unicast. In other implementations, the HLS variant playlist file may be generated by a different node than eMBMS HLS multicast publisher 120, and multicast HLS player 200 may retrieve the HLS variant playlist from that node. FIG. 7 depicts UE 105 joining 710 the multicast HLS session using the service ID broadcast in service announcement 700, and UE 105 receiving the variant playlist file 720 that corresponds to the service ID from eMBMS HLS multicast publisher 120.

In an embodiment in which the content includes VOD content, multicast HLS player 200 of UE 105 may only need to retrieve the HLS variant playlist file once, since the HLS variant playlist file includes a complete sequence of URIs for the VOD content (i.e., not being live content, the URIs are not being continuously updated as new HLS segment files are added). In an embodiment in which the content includes live content, however, multicast HLS player 200 of UE 105 may need to periodically (e.g., at a specified interval) retrieve an updated HLS variant playlist file from eMBMS HLS multicast publisher 120 (or from another node). In this embodiment, the updated HLS variant playlist file includes new URIs corresponding to HLS segment files generated up through a current time for the live content.

UE 105 receives HLS segment files broadcast over a multicast bearer (broadcast in block 450 of FIG. 4), and stores the files (e.g., locally) (block 620). FIG. 7 depicts BM-SC 205 retrieving the HLS segment files from webDAV folder 530, and broadcasting 730 the retrieved HLS segment files via MBMS-GW 210 to UE 105 (and other UEs in eMBMS synchronization area(s) 225 not shown). Multicast HLS player 200 of UE 105 retrieves the locally stored HLS segment files, and plays the retrieved HLS segment files according to a sequence specified in the variant playlist file (block 630). The variant playlist file identifies the playback sequence of the HLS segment files, and Multicast HLS player 200 of UE 105 uses the variant playlist file to playback the HLS segment files in the proper sequence to ensure a continuous media playback. For live content, multicast HLS player 200 of UE 105 may play the HLS segment files according to the sequence specified in the most recent, updated HLS variant playlist file received at UE 105 (as described above with respect to block 610). FIG. 7 depicts multicast HLS player 200 of UE 105 playing back 740 the received HLS segment files according to the sequence specified in the variant playlist file.

The exemplary process of FIG. 6 may be repeated for each multicast content session joined by a UE 105 in wireless network 110.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with respect to FIGS. 4A, 4B, and 6, and message flows with respect to FIGS. 5 and 7, the order of the blocks and/or message flows may be varied in other implementations. Moreover, non-dependent blocks may be performed in parallel. For example, while embodiments have been described in the context of Evolved MBMS (eMBMS), or LTE broadcast, in other embodiments, HLS multicasting may be implemented in other types of wireless networks (i.e., other than LTE networks) using MBMS. Embodiments have additionally been described herein with respect to live content, where such content may have a specified broadcast start time and stop time. However, the HLS multicasting using MBMS, described herein, may apply to VOD content that is not live, but has been previously stored in CDN 125 for on-demand access. With either live content or VOD content, though, the content may be broadcast with a specified start time and stop time.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a Multimedia Broadcast Multicast Services (MBMS) publishing device, a location of a Hypertext Transfer Protocol (HTTP) Live Streaming (HLS) master playlist for content, to be multicast, that is stored in a content delivery network (CDN), wherein the MBMS publishing device is deployed between the CDN and a public network;
retrieving, by the MBMS publishing device using the location, the HLS master playlist from the CDN;
resolving, by the MBMS publishing device using the HLS master playlist, a Uniform Resource Locator (URL) for a first HLS variant playlist file for the content to be multicast;
initiating a HLS session, by the MBMS publishing device, by retrieving, using the resolved URL, the first HLS variant playlist file from the CDN;
retrieving, by the MBMS publishing device, HLS segment files from the CDN based on the first HLS variant playlist file; and
storing, by the MBMS publishing device, the HLS segment files temporarily in a Web Distributed Authoring and Versioning (webDAV) folder in a MBMS broadcast multicast service center (BM-SC) deployed in a wireless network connected to the public network, wherein the BM-SC retrieves the HLS segment files from the webDAV folder and multicasts the HLS segment files via a MBMS gateway (MBMS-GW) to a MBMS synchronization area of the wireless network via a multicast bearer, wherein the MBMS synchronization area includes a plurality of eNodeBs (eNBs) that are synchronized to multicast the HLS segment files via a same multicast channel.

2. The method of claim 1, further comprising:
receiving, by the MBMS publishing device, a start time and a stop time associated with a HLS multicast content session associated with the HLS segment files,
wherein the HLS session is initiated at the start time, and completes at the stop time.

3. The method of claim 1, wherein the MBMS publishing device comprises an evolved MBMS (eMBMS) publishing device and wherein the wireless network comprises a Long Term Evolution (LTE) cellular network.

4. The method of claim 1, wherein the HLS master playlist comprises a list of URLs associated with a plurality of different HLS variant playlist files.

5. The method of claim 4, wherein the first HLS variant playlist file comprises one of the plurality of different HLS variant playlist files.

6. The method of claim 1, further comprising:
multicasting, from the BM-SC via the multicast bearer, the HLS segment files to the plurality of eNBs in the MBMS synchronization area of the wireless network to User Equipments (UEs) served by the plurality of eNBs.

7. The method of claim 1, further comprising:
broadcasting a service announcement notifying User Equipments (UEs) in the MBMS synchronization area of the wireless network of a multicast HLS content session associated with the HLS segment files, wherein the service announcement includes a service identifier (ID) for the HLS segment files.

8. The method of claim 7, further comprising:
receiving, at the BM-SC, a request to join the multicast HLS content session from a first UE of the UEs in the MBMS synchronization area;
forwarding, by the BM-SC, the request to the MBMS publishing device;
receiving, by the BM-SC from the MBMS publishing device, the first HLS variant playlist file; and
sending, by the BM-SC, the first HLS variant playlist file to the first UE via the MBMS-GW.

9. A network device, comprising:
a communication interface connected to a public network; and
a processor configured to:
receive, via the communication interface, a location of a Hypertext Transfer Protocol (HTTP) Live Streaming (HLS) master playlist for content, to be multicast, that is stored in a content delivery network (CDN), wherein the network device is deployed between the CDN and a public network,
pull, via the communication interface using the location, the HLS master playlist from the CDN,
pull, via the communication interface based on the HLS master playlist, HLS segment files from the CDN, and
temporarily store, via the communication interface, the HLS segment files in a Web Distributed Authoring and Versioning (webDAV) folder in a Multimedia Broadcast Multicast Services (MBMS) broadcast multicast service center (BM-SC) deployed in a wireless network connected to the public network, wherein the BM-SC retrieves the HLS segment files from the webDAV folder and multicasts the HLS segment files via a MBMS gateway (MBMS-GW) to a MBMS synchronization area of the wireless network via a multicast bearer, wherein the MBMS synchronization area includes a plurality of eNodeBs that are synchronized to multicast the HLS segment files via a same multicast channel.

10. The network device of claim 9, wherein, when pulling the HLS segment files from the CDN, the processor is further configured to:
resolve, using the HLS master playlist, a Uniform Resource Locator (URL) for a first HLS variant playlist file for the content to be multicast,
pull, using the resolved URL, the first HLS variant playlist file from the CDN, and
retrieve the HLS segment files from the CDN based on the first HLS variant playlist file.

11. The network device of claim 10, wherein the HLS master playlist comprises a list of URLs associated with a plurality of different HLS variant playlist files.

12. The network device of claim 11, wherein the first HLS variant playlist file comprises one of the plurality of different HLS variant playlist files.

13. The network device of claim 10, wherein the processor is further configured to:
receive, via the communication interface, a request to join a multicast HLS content session from a first UE of the UEs in the MBMS synchronization area; and
send, via the BM-SC and the MBMS-GW, the first HLS variant playlist file to the first UE.

14. The network device of claim 9, wherein the network device comprises a MBMS publishing device.

15. The network device of claim 14, wherein the MBMS publishing device comprises an evolved MBMS (eMBMS) publishing device and wherein the wireless network comprises a Long Term Evolution (LTE) cellular network.

16. A non-transitory storage medium storing instructions executable by a Multimedia Broadcast Multicast Services (MBMS) publishing device, wherein the instructions comprise instructions to cause the MBMS publishing device to:
receive a location of a Hypertext Transfer Protocol (HTTP) Live Streaming (HLS) master playlist for content, to be multicast, that is stored in a content delivery network (CDN), wherein the MBMS publishing device is deployed between the CDN and a public network;
pull, using the location, the HLS master playlist from the CDN;
pull, based on the HLS master playlist, HLS segment files from the CDN; and
temporarily store the HLS segment files in a Web Distributed Authoring and Versioning (webDAV) folder in a Multimedia Broadcast Multicast Services (MBMS) broadcast multicast service center (BM-SC) deployed in a wireless network connected to the public network, wherein the BM-SC retrieves the HLS segment files from the webDAV folder and multicasts the HLS segment files via a MBMS gateway (MBMS-GW) to a MBMS synchronization area of the wireless network via a multicast bearer, wherein the MBMS synchronization area includes a plurality of eNodeBs that are synchronized to multicast the HLS segment files via a same multicast channel.

17. The non-transitory storage medium of claim 16, wherein the instructions further comprise instructions to cause the MBMS publishing device, when pulling the HLS segment files from the CDN, to:
resolve, using the HLS master playlist, a Uniform Resource Locator (URL) for a HLS variant playlist file for the content to be multicast;
pull, using the resolved URL, the HLS variant playlist file from the CDN; and
retrieve the HLS segment files from the CDN based on the HLS variant playlist file.

18. The non-transitory storage medium of claim 16, wherein MBMS publishing device comprises an evolved MBMS (eMBMS) publishing device and wherein the wireless network comprises a Long Term Evolution (LTE) cellular network.

19. The non-transitory storage medium of claim 16, wherein the HLS master playlist comprises a list of URLs associated with a plurality of different HLS variant playlist files.

20. The non-transitory storage medium of claim 16, wherein the instructions further comprise instructions to cause the MBMS publishing device to:
receive a request to join a multicast HLS content session from a first UE of the UEs in the MBMS synchronization area; and
send, via the BM-SC and the MBMS-GW, the HLS variant playlist file to the first UE.

* * * * *